UNITED STATES PATENT OFFICE.

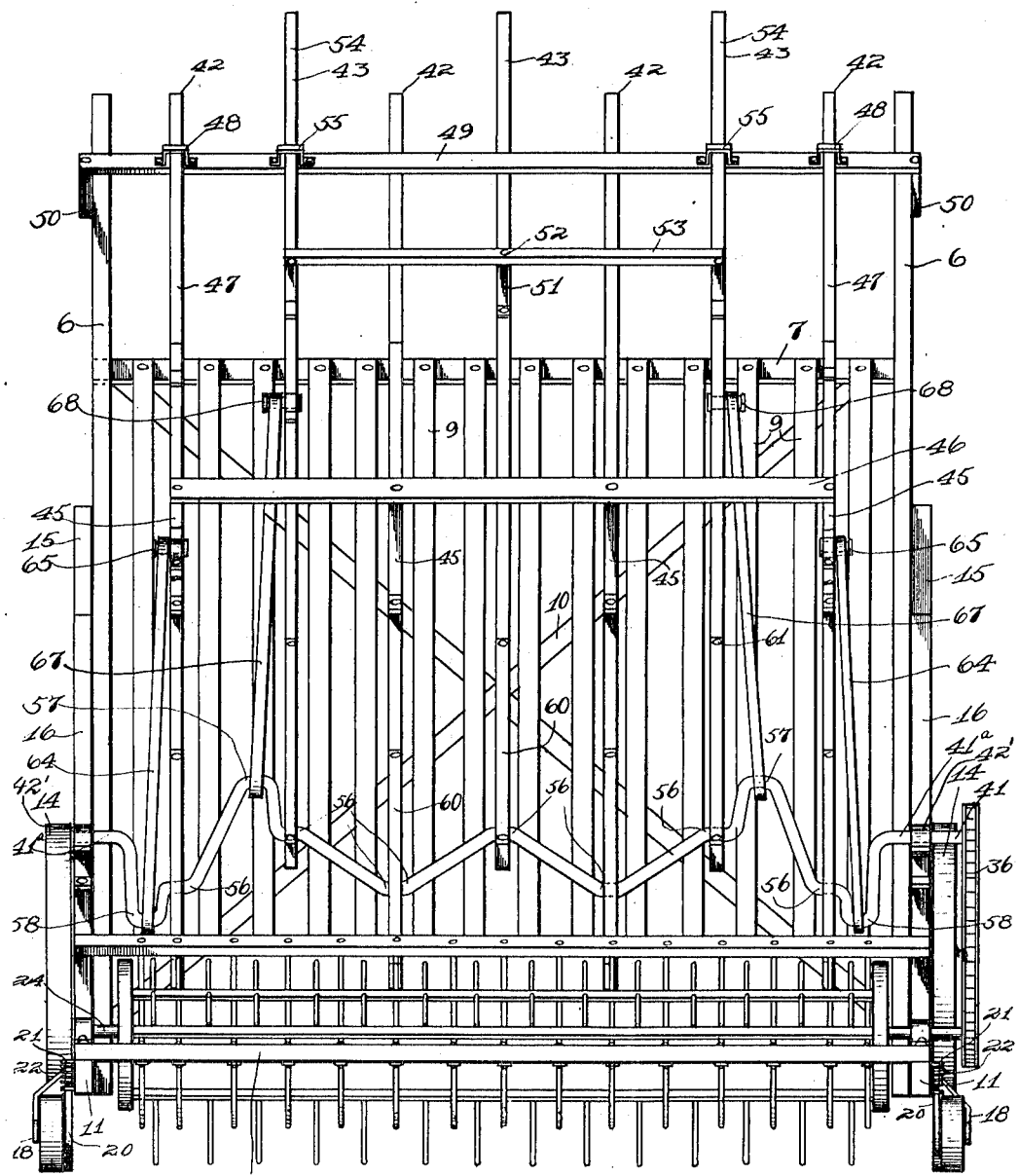

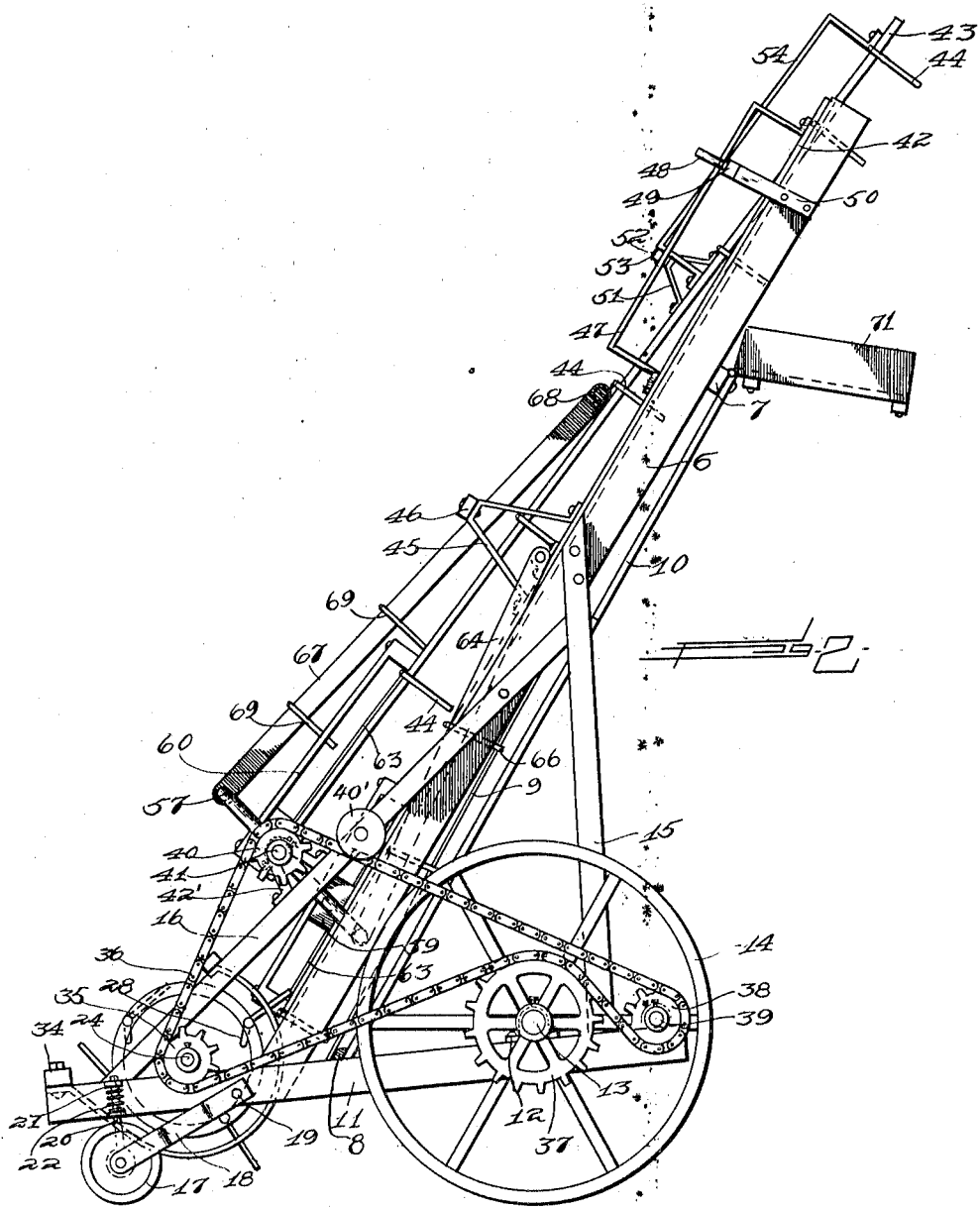

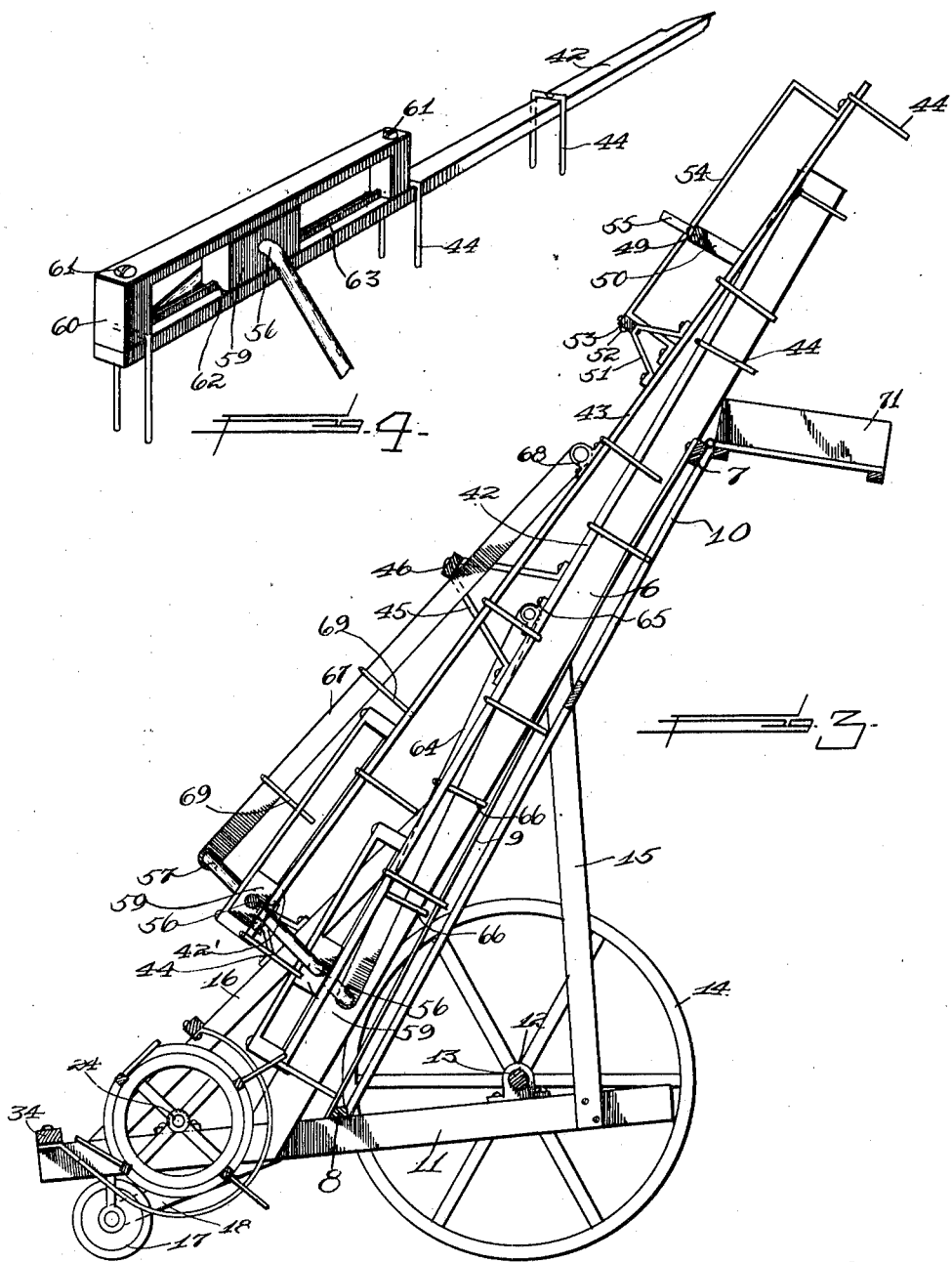

AUGUST OTTO, JR., OF SANDWICH, ILLINOIS.

HAY-LOADER.

1,099,311. Specification of Letters Patent. Patented June 9, 1914.

Application filed April 12, 1913. Serial No. 760,803.

*To all whom it may concern:*

Be it known that I, AUGUST OTTO, Jr., a citizen of the United States, residing at Sandwich, in the county of Dekalb and State of Illinois, have invented certain new and useful Improvements in Hay-Loaders, of which the following is a specification.

My invention relates to apparatus for gathering up hay or the like and conveying the same to a desired point, and has particular reference to a hay loader of the reciprocatory or walking rake type, which is adapted to be suitably connected with the rear end of a wagon or the like to travel therewith and operate continuously by being drawn along with the wagon for supplying the hay or the like to the same.

An important object of this invention is to provide a hay loader of the reciprocatory or walking rake type, which is so constructed that the hay or the like will be fed by the same to the desired point, in an expeditious and continuous manner, without the hay choking the loader or remaining therein, as not infrequently happens with hay loaders of this type, as heretofore constructed.

A further object of my invention is to provide conveyer mechanism embodying reciprocatory or walking teeth carrying beams for effecting the feeding movement of the hay or the like, the same having means to operate them which are in the form of teeth carrying pitmen or beams, the same thus serving as additional means to effect the feeding movement of the hay or the like.

A further object of my invention is to provide novel means to operate the reciprocatory or walking teeth carrying beams, such means in addition to serving as means to effect the feeding movement of the hay, causing the teeth carrying beams to move longitudinally a much greater distance than transversely.

A further object of this invention is to provide an improved crank-shaft, included in the means for operating the teeth carrying beams.

A further object of this invention is to provide an apparatus of the above mentioned character, which is strong, durable, comparatively cheap to manufacture, easy to operate, and automatic and continuous in such operation.

Other objects and advantages of this invention will be apparent during the course of the following description.

In the accompanying drawings, forming a part of this specification, and in which like numerals are employed to designate like parts throughout the same, Figure 1 is a front view of the complete apparatus, Fig. 2 is a side view of the same, Fig. 3 is a central vertical longitudinal sectional view through the same, and Fig. 4 is an enlarged perspective view of one of the teeth carrying beams and associated elements, parts thereof being broken away.

In the drawings, wherein for the purpose of illustration is shown a preferred embodiment of my invention, a hay loader is shown comprising a normally inclined preferably rectangular frame including longitudinal beams 6, which are connected near their upper and lower ends by transverse beams 7 and 8. Secured to these transverse beams are suitably spaced slats 9, serving as a bottom for the normally inclined frame. Disposed upon the outer side of the transverse beams 7 and 8 are diagonal reinforcing strips 10, rigidly connected with the longitudinal beams 6, and crossing, as shown. The normally inclined frame is rigidly mounted upon a substantially horizontal frame comprising horizontal beams 11, to which the longitudinal beams 6 are suitably attached. The horizontal beams 11 have upstanding journal boxes or bearings 12 rigidly connected therewith near and spaced from the forward ends thereof, for receiving an axle 13, upon which are rotatably mounted traction wheels 14, as shown. Upstanding supports 15 are connected with the longitudinal beams 6 and the horizontal beams 11, as shown. Connected with the rear end of the horizontal beams 11 are inclined beams 16, which extend upwardly for connection with the longitudinal beams 6, as shown. The rear ends of the horizontal beams 11 are supported by small wheels 17, carried by brackets 18, the upper ends of which are pivotally connected with the horizontal beams 11 to swing in a substantially vertical plane, as shown at 19. Connected with each of the wheels 17 is a reciprocatory rod 20, operating through a bracket 21, which is rigidly mounted upon the rear end of the horizontal beam 11. The upward longitudinal movement of the rod 20 is opposed by a suitably stiff compressible coil spring 22, as shown.

The numeral 24 designates a rotatable rake of any well known or preferred type, which is suitably mounted upon the horizontal frame, as shown.

The rotatable rake 24 receives its rotation from a sprocket wheel 35, rigidly connected therewith, the same being driven by a sprocket chain 36, extending forwardly to engage with a large sprocket wheel 37, rigidly connected with one of the traction wheels 14, for rotation therewith. The sprocket chain 36 is trained about an idler sprocket wheel 38, which is suitably rotatably mounted upon the forward end of the horizontal beam 11, as shown at 39. The rear portion of the sprocket chain 36 extends upwardly to engage a small sprocket wheel 40, rigidly mounted upon a transverse operating crank-shaft 41 as shown. This upper rear portion of the sprocket chain 36 is engaged by an adjustable tension pulley 40', as shown. The free ends 41ᵃ of this transverse operating crank-shaft 41 are journaled through bearings 42', which are rigidly mounted upon the inclined beams 16, as shown.

I provide conveyer mechanism for conveying or elevating the hay or the like from proximity to the rotatable rake, which gathers up the hay and delivers the same to such conveyer mechanism. This conveyer mechanism comprises a plurality of sets of longitudinally movable and suitably flexible beams 42 and 43, carrying depending teeth 44, as shown. The beams 42 in one set move together and the beams 43 in the other set move together, such sets moving independently of each other. Rigidly connected with the teeth carrying beams 42 are upstanding V-shaped brackets 45, which are connected by a transverse bar or strip 46, as shown. The outer teeth carrying beams 42 have guide brackets 47 connected with the upper ends thereof, operating within relatively stationary guides 48, fixedly mounted upon an upper transverse beam or rod 49, as shown. The transverse beam 49 is attached to the upper ends of upstanding standards or supports 50 which are rigidly connected with the upper ends of the longitudinal beams 6, as shown. Attention is called to the fact that the two inner suitably flexible longitudinal teeth carrying beams 42 in the same set are not provided with the guide brackets 47, whereby the upper end portions thereof are free to bend or swing downwardly by their own weight below the upper end portions of the outer teeth carrying beams 42. This is an important feature of the invention as it produces the proper final discharge of the hay from the loader. The inner teeth carrying beam 43 is provided with an upstanding V-shaped bracket 51, having connection, as shown at 52, with a transverse rod or strip 53. This transverse rod 53 is connected at its ends with guide brackets 54, rigidly mounted upon the outer teeth carrying beams 43. The guide brackets 54 operate through relatively stationary guides 55, which are rigidly attached to the transverse beam 49, as shown. The upper end portion of the inner teeth carrying beam 43, being suitably flexible, bends or swings downwardly below the corresponding end portions of the outer beams 43, for the purpose described in connection with the inner beams 42.

The construction of the transverse operating crank-shaft 41 is an important feature of this invention. This crank-shaft is easy to make, economical in material with a corresponding saving in the cost thereof, and enables the placing of a greater number of cranks into a given transverse space. The crank-shaft 41 is provided with small cranks or crank portions 56, as shown. Adjacent the outer small cranks 56 are inner and outer enlarged cranks 57 and 58, the outer enlarged cranks 58 serving to effect the longitudinal movement of the teeth carrying beams 42, and the inner enlarged cranks 57 serving to effect the longitudinal movement of the teeth carrying beams 43. Each of the small cranks 56, are journaled through a slidable block 59, (see Fig. 5), which is mounted upon the teeth carrying beam to move longitudinally thereof. The slidable block 59 is mounted within a guide bracket 60, which is connected with the teeth carrying beam by means of screws or bolts 61. The slidable block 59 is provided upon its lower face with a longitudinal groove 62, receiving a spline or rib 63, which is rigidly mounted upon the teeth carrying beams, as shown. It is thus seen that the small cranks 56 serve to raise and lower the lower ends of the teeth carrying beams but do not effect their longitudinal movement.

Pivotally connected with the outer enlarged cranks 58 are pitmen 64, the upper ends of which are pivotally connected with the outer teeth carrying beams 42, as shown at 65. It is obvious that these pitmen effect the longitudinal movement of all of the teeth carrying beams 42. The pitmen 64 carry depending teeth 66, which serve to effect the feeding movement of the hay or the like. Pivotally connected with the inner enlarged cranks 57 are pitmen 67, extending upwardly for pivotal connection with the outer teeth carrying beams 43, as shown at 68. These pitmen 67 carry depending teeth 69, which aid in effecting the feeding movement of the hay or the like.

Particular attention is called to the fact that the two sets of pitmen 64 and 67 are provided with teeth (the same being hereinafter termed teeth carrying pitmen), to aid in the feeding movement of the hay or the like. By this construction, the width of the apparatus as a whole may be materially reduced, as these pitmen serve as additional reciprocatory teeth carrying beams. Besides this, these pitmen being connected with the enlarged cranks, are moved downwardly for a greater distance than the teeth carrying beams, whereby they are capable of engaging with portions of the hay which may not be fed by the movement of the teeth carrying beams. It has been found by experience, that there is a tendency for the hay to accumulate at or near the longitudinal beams 6 of the inclined frame, which disadvantage is entirely overcome by the provision of the teeth carrying pitmen, which are disposed adjacent the longitudinal beams 6. Connected with the upper transverse beam 7 is a discharge chute 71, to conduct the hay or the like into the wagon.

The operation of the apparatus is as follows: The hay loader is disposed in the rear of a wagon or the like and is suitably connected therewith to be drawn along with it. The rotation of the traction wheel 14 is imparted to the sprocket wheel 35 through the medium of the sprocket chain 36, such sprocket wheel rotating counter-clock-wise for rotating the rake 24 in the same direction. The hay thus delivered to the lower end of the slats 9 or inclined frame, is engaged by the teeth 44 of the beams 42 and 43, and is fed upwardly by the same. The set of teeth carrying beams 42 are reciprocated by the teeth carrying pitmen 64, which receive their movement from the outer enlarged cranks 58. The teeth 66 carried by the outer pitmen 64 also engage the hay to effect the upward or longitudinal travel of the same. The teeth carrying pitmen 64 are capable of moving downwardly a greater distance than the main teeth carrying beams, whereby the same will effect the feeding movement of some of the hay which may not be properly engaged by the main teeth carrying beams, particularly the hay accumulating adjacent the side beams 6. The normal cranks 56 serve to raise and lower the lower ends of the teeth carrying beams 42, while the pitmen 64 effect their longitudinal travel, which is much greater than the transverse movement of the lower ends thereof. This is rendered possible by the provision of the blocks 59, having the normal cranks 56 pivotally connected therewith, such blocks being slidably mounted upon the teeth carrying beams. The upper ends of the outer teeth carrying beams 42 have slidable connection with the transverse beam 49, while the upper ends of the inner teeth carrying beams 42 are free from such connection, whereby, the same being suitably stiff and flexible, will swing or bend downwardly by their own weight. It has been found that this bending of the inner teeth carrying beams 42 is very important as it provides a proper final discharge of the hay from the loader. The operation of the teeth carrying beams 43 is similar to that of the teeth carrying beams 42, the teeth carrying beams 43 always moving in an opposite direction. The longitudinal movement of the teeth carrying beams 43 is effected by the teeth carrying pitmen 67, which also aid in the feeding movement of the hay. The upper end portion of the inner suitably stiff and flexible teeth carrying beams 43 being free from connection with the transverse beam 49, swings or bends downwardly by its own weight, a suitable distance, for effecting the proper final discharge of the hay from the loader. The upper ends of the outer teeth carrying beams 43 have slidable connection with the transverse beam 49. The hay is finally delivered into the chute 71 and conducted thereby to the wagon.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. In apparatus of the character described, the combination with a wheeled supporting structure, of a plurality of teeth carrying beams mounted thereon and extending longitudinally thereof, a transverse crank-shaft connected with the supporting structure and having suitable connection with the teeth carrying beams, teeth carrying pitmen pivotally connected with certain of the teeth carrying beams and having suitable connection with the transverse crank-shaft and means to drive the crank shaft.

2. In apparatus of the character described, the combination with a supporting structure serving as a chute through which hay or the like is fed, of a plurality of teeth carrying beams extending longitudinally of the supporting structure, a transverse crank-shaft arranged near the supporting structure and having suitable connection with the teeth carrying beams, teeth carrying pitmen pivotally connected with certain of the teeth carrying beams between the ends of said certain teeth carrying beams and arranged inwardly of and adjacent the longitudinal sides of the supporting structure and having suitable connection with the crank-shaft, and means to rotate the crank-shaft.

3. In apparatus of the character described, the combination with a wheeled supporting structure, of a transverse crank-shaft mounted thereon and including small and large cranks, a plurality of longitudinal teeth carrying beams having loose pivotal connection with the small cranks, teeth carrying pitmen pivotally connected with the large cranks and with certain of the teeth carrying beams, and means to rotate the crank-shaft.

4. In a hay loader, the combination with an inclined hay supporting structure, of a plurality of sets of reciprocable teeth carrying members mounted above the hay supporting structure, means for oscillating the lower ends of the teeth carrying members of each set in a vertical plane, and separate supplemental means having a greater vertical movement than any of the said teeth carrying members for moving hay from the lower outer portions of the hay supporting structure.

5. In a hay loader, the combination with an inclined hay supporting structure, of main reciprocable teeth carrying members, means for oscillating the teeth carrying members in vertical planes, supplemental reciprocable teeth carrying members adjacent each lower edge of the hay supporting structure and means to oscillate the supplemental teeth carrying members in a vertical plane, the last named teeth carrying members being mounted to move downwardly a greater distance than the main teeth carrying members.

6. In a hay loader, the combination with an inclined hay supporting structure, of a transversely disposed rotatable shaft associated therewith and provided with small and large cranks, reciprocable teeth-carrying members connected with the small cranks and extending longitudinally of the supporting structure, reciprocatory teeth carrying members connected with the large cranks to be moved thereby downwardly for a substantial distance beyond the end of the downward travel of the first named teeth-carrying members, said last named teeth carrying members being arranged to operate adjacent the longitudinal edges of the hay supporting structure to remove hay or the like therefrom, and means to rotate the shaft.

In testimony whereof I affix my signature in presence of two witnesses.

AUGUST OTTO, Jr.

Witnesses:
 E. D. Mosher,
 E. L. Ingersoll.